(12) United States Patent
Loose

(10) Patent No.: US 9,965,918 B2
(45) Date of Patent: May 8, 2018

(54) OVERLAPPING LCD DISPLAYS FOR A GAMING MACHINE

(71) Applicant: BALLY GAMING, INC., Las Vegas, NV (US)

(72) Inventor: Timothy C. Loose, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 361 days.

(21) Appl. No.: 14/810,184

(22) Filed: Jul. 27, 2015

(65) Prior Publication Data

US 2017/0004673 A1    Jan. 5, 2017

Related U.S. Application Data

(60) Provisional application No. 62/031,539, filed on Jul. 31, 2014.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *G07F 17/32* | (2006.01) |
| *G02F 1/1333* | (2006.01) |
| *F21V 8/00* | (2006.01) |

(52) U.S. Cl.
CPC ...... *G07F 17/3211* (2013.01); *G02F 1/13336* (2013.01); *G07F 17/3209* (2013.01); *G07F 17/3244* (2013.01); *G02B 6/008* (2013.01); *G02B 6/0045* (2013.01)

(58) Field of Classification Search
USPC ............................ 463/20, 22, 25, 31, 42, 46
See application file for complete search history.

(56) References Cited

U.S. PATENT DOCUMENTS

| | | | |
|---|---|---|---|
| 1,167,653 A | 1/1916 | Nielsen | 271/253 |
| 4,885,663 A | 12/1989 | Parker | 362/561 |
| 4,907,132 A | 3/1990 | Parker | 362/556 |
| 5,005,108 A | 4/1991 | Pristash et al. | 362/602 |
| 5,042,900 A | 8/1991 | Parker | 385/76 |
| 5,513,851 A | 5/1996 | Harris | 273/274 |
| 5,537,290 A | 7/1996 | Brown et al. | 361/681 |
| 5,568,964 A | 10/1996 | Parker et al. | 362/556 |

(Continued)

FOREIGN PATENT DOCUMENTS

DE    4211311 C2    4/1996 ............ G07F 17/32

*Primary Examiner* — Adetokunbo O Torimiro
(74) *Attorney, Agent, or Firm* — David J. Bremer

(57) ABSTRACT

A gaming system includes a liquid crystal display (LCD) assembly including a first LCD panel and a second LCD panel. The first LCD panel and the second LCD panel each have an active display region between two opposing inactive sides of the respective LCD panel. At least one LCD panel includes an LCD glass panel which is cut, removing the majority of the inactive side and creating a smaller, inactive side at the edge of the respective LCD panel, adjacent to the active display region. The first and second LCD panels are mounted onto a single light source illuminating both the first and second LCD panels, such that inactive side at the edge of the at least one cut LCD panel overlaps another inactive side of the other LCD panel at one edge without obscuring any of the active display region of either LCD panel.

18 Claims, 6 Drawing Sheets

(56) References Cited

U.S. PATENT DOCUMENTS

| | | | |
|---|---|---|---|
| 5,732,948 A | 3/1998 | Yoseloff | 273/274 |
| 5,765,797 A | 6/1998 | Greene et al. | 248/398 |
| RE35,864 E | 7/1998 | Weingardt | 463/28 |
| 5,806,847 A | 9/1998 | White et al. | 273/274 |
| 5,924,926 A | 7/1999 | Brown | 463/11 |
| 5,961,119 A | 10/1999 | Brown | 273/292 |
| 6,062,563 A | 5/2000 | De Keller | 273/274 |
| 6,079,838 A | 6/2000 | Parker | 362/617 |
| 6,120,377 A | 9/2000 | McGinnis et al. | 463/20 |
| 6,123,335 A | 9/2000 | Adkins | 273/292 |
| 6,134,103 A | 10/2000 | Ghanma | 361/681 |
| 6,158,867 A | 12/2000 | Parker et al. | 362/29 |
| 6,213,876 B1 | 4/2001 | Moore, Jr. | 463/22 |
| 6,234,482 B1 | 5/2001 | Henderson | 273/274 |
| 6,270,411 B1 | 8/2001 | Gura et al. | 463/20 |
| 6,273,423 B1 | 8/2001 | Promutico | 273/274 |
| 6,286,834 B1 | 9/2001 | Caputo et al. | 273/274 |
| 6,315,666 B1 | 11/2001 | Mastera et al. | 463/31 |
| 6,336,633 B1 | 1/2002 | Webb | 273/274 |
| 6,378,869 B1 | 4/2002 | Hedge, Jr. et al. | 273/274 |
| 6,508,469 B2 | 1/2003 | Promutico | 273/274 |
| 6,508,707 B2 | 1/2003 | Demar et al. | 463/16 |
| 6,646,695 B1 | 11/2003 | Gauselmann | 349/58 |
| 6,761,353 B2 | 7/2004 | Berman et al. | 273/143 R |
| 6,776,413 B2 | 8/2004 | Brown, III et al. | 273/146 |
| 6,854,732 B2 | 2/2005 | Moody | 273/274 |
| 6,861,600 B1 | 3/2005 | Schulz et al. | 200/310 |
| 6,874,925 B2 | 4/2005 | Page et al. | 362/554 |
| 6,896,264 B1 | 5/2005 | Haber | 273/274 |
| 6,910,783 B2 | 6/2005 | Mezei et al. | 362/615 |
| 7,137,884 B2 | 11/2006 | Gilmore | 463/16 |
| 7,195,560 B2 | 3/2007 | Demar et al. | 463/20 |
| 7,217,021 B2 | 5/2007 | Lee | 362/551 |
| 7,305,163 B2 | 12/2007 | Williams | 385/45 |
| 7,387,572 B2 | 6/2008 | Hanchar | 463/46 |
| 7,438,641 B2 | 10/2008 | Hedrick | 463/30 |
| 7,513,830 B2 | 4/2009 | Hajder et al. | 463/46 |
| 7,540,806 B2 | 6/2009 | Tastad | 463/46 |
| 7,566,269 B2 | 7/2009 | B-Jensen et al. | 463/20 |
| 7,594,852 B2 | 9/2009 | Rasmussen | 463/20 |
| 7,611,408 B2 | 11/2009 | Martin et al. | 463/29 |
| 7,775,888 B2 | 8/2010 | Wudtke | 463/46 |
| 7,780,534 B2 | 8/2010 | Wudtke | 463/46 |
| 7,916,223 B2 * | 3/2011 | Kitagawa | G02F 1/133504 349/15 |
| 2002/0031316 A1 | 3/2002 | Lowry | 385/120 |
| 2003/0060269 A1 | 3/2003 | Paulsen et al. | 463/20 |
| 2004/0053658 A1 | 3/2004 | Rothranz | 463/16 |
| 2004/0147300 A1 | 7/2004 | Seelig et al. | 463/1 |
| 2004/0248647 A1 | 12/2004 | Rothschild et al. | 463/30 |
| 2004/0248648 A1 | 12/2004 | Rothschild et al. | 463/31 |
| 2005/0020348 A1 | 1/2005 | Thomas et al. | 463/20 |
| 2005/0049028 A1 | 3/2005 | Gornez et al. | 463/20 |
| 2005/0197181 A1 | 9/2005 | Jaffe | 463/20 |
| 2006/0014580 A1 | 1/2006 | Hawthorn | 463/20 |
| 2006/0160598 A1 | 7/2006 | Wells et al. | 463/16 |
| 2006/0183544 A1 | 8/2006 | Okada | 463/31 |
| 2006/0277805 A1 | 12/2006 | Kopera et al. | 40/584 |
| 2007/0021183 A1 | 1/2007 | Fiden et al. | 463/17 |
| 2007/0111776 A1 | 5/2007 | Griswold et al. | 463/16 |
| 2007/0207861 A1 * | 9/2007 | Gawel | G07F 17/32 463/46 |
| 2007/0259706 A1 | 11/2007 | Anderson et al. | 463/16 |
| 2008/0113821 A1 | 5/2008 | Beadell et al. | 463/46 |
| 2008/0129923 A1 * | 6/2008 | Hu | G02F 1/13336 349/64 |
| 2008/0227526 A1 | 9/2008 | Crossman et al. | 463/20 |
| 2009/0036197 A1 | 2/2009 | Anderson et al. | 463/20 |
| 2009/0124339 A1 | 5/2009 | Barton et al. | 463/20 |
| 2009/0137311 A1 | 5/2009 | Iverson et al. | 463/20 |
| 2009/0191965 A1 | 7/2009 | Dixon | 463/31 |
| 2009/0325692 A1 | 12/2009 | Klostermann et al. | 463/30 |
| 2010/0048288 A1 | 2/2010 | Canterbury et al. | 463/20 |
| 2010/0210354 A1 | 8/2010 | Burak et al. | 463/25 |
| 2010/0317433 A1 | 12/2010 | Ansari et al. | 463/30 |
| 2011/0003630 A1 | 1/2011 | Rasmussen et al. | 463/20 |
| 2011/0255300 A1 | 10/2011 | Porter et al. | 362/554 |
| 2013/0157751 A1 * | 6/2013 | Loose | G07F 17/3211 463/25 |

* cited by examiner

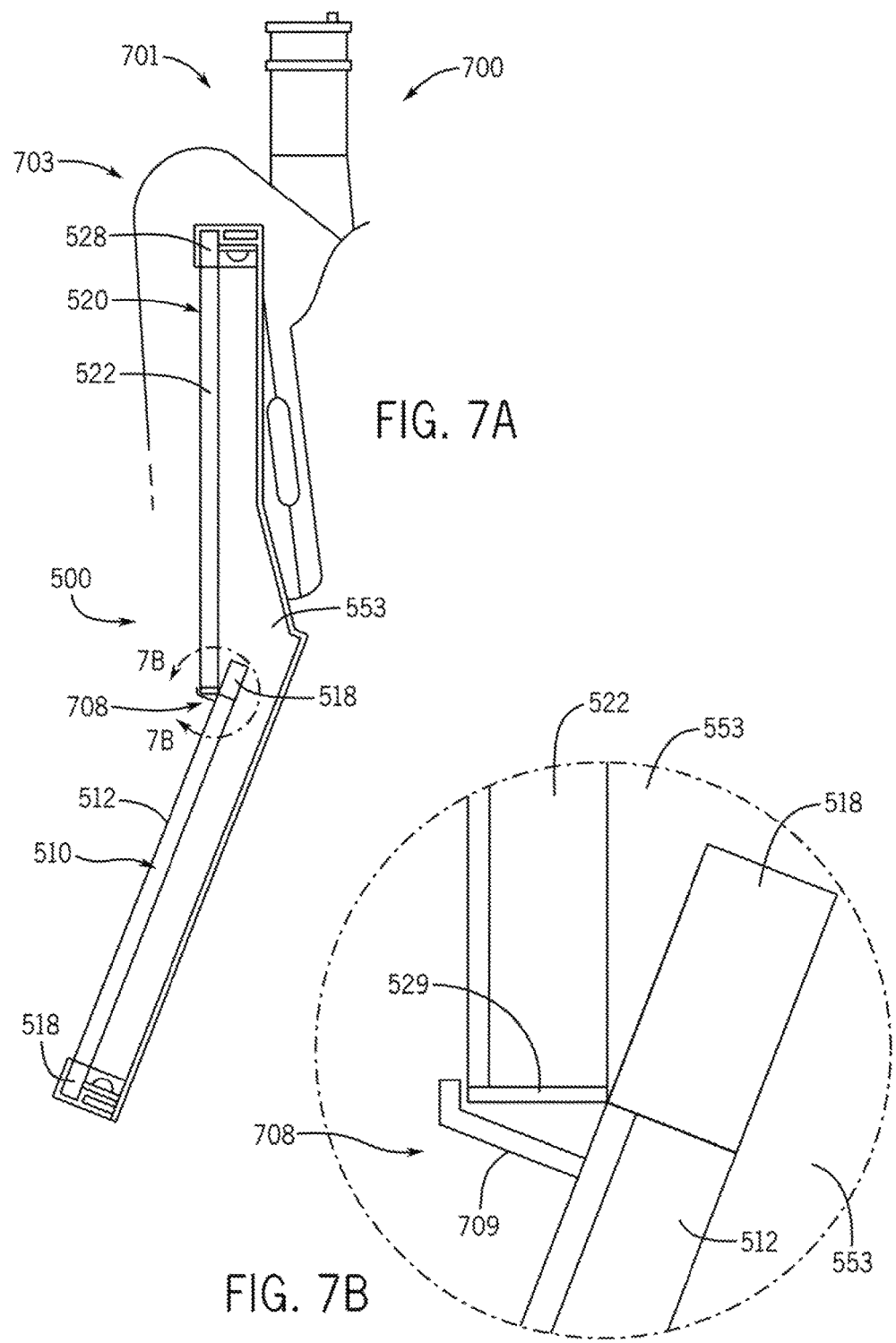

OVERLAPPING LCD DISPLAYS FOR A GAMING MACHINE

RELATED APPLICATIONS

This patent application claims the priority benefit of U.S. Provisional Patent Application Ser. No. 62/031,539, filed Jul. 31, 2014 and entitled "OVERLAPPING LCD DISPLAYS FOR A GAMING MACHINE", incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to overlapping Liquid Crystal Display (LCD) devices for a gaming machine.

BACKGROUND OF THE INVENTION

Electronic gaming machines (EGMs), such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

It is beneficial to be able to join two (or even three) smaller LCD devices to create a larger canvas on which to draw and display images. Curving a larger screen is known in the art, but there are cost and reliability issues. An advantage of using multiple LCDs together is that the total resolution is higher. However, joining smaller screens is problematic due to limitations on the narrowness of the bezels of the LCDs, and the resultant spacing between LCD screens. Larger LCDs may have inactive area widths at the edges of the display of approximately 3 mm to 4 mm, resulting in an image to image gap between two monitors of 6 mm to 7 mm (roughly ¼ inch). The gap is generally black and is incapable of displaying imagery. A gap of this size is relatively inobtrusive with multiple fifty-five inch displays when viewed from a reasonable distance (10+ feet). However, the same size gap would be objectionable between two twenty-four inch LCD monitors operating as the main display in an EGM, viewed from a distance of eighteen to twenty-four inches.

A display transition device may be used to shield the gap from a viewer, such as the type disclosed in U.S. Patent Application Publication 2013/0157751 A1, by Timothy Loose et al., incorporated herein by reference in its entirety. This disclosure describes a means for treating the gap between display areas to make it less objectionable. This is accomplished by creating a transition area that can be illuminated with an RGB LED or OLED system. The color and/or imagery for the transition area would be chosen to complement the images on the two adjacent LCDs.

The present invention uses two adjacent LCD display devices, where an inactive edge of one LCD glass panel overlaps the inactive edge of another LCD panel, thereby minimizing the gap between the LCD panels. One or both of the LCD panels may be cut and modified in this manner. Multiple LCD panels may overlap creating a basis for a horizontal or vertical panoramic display system for a gaming machine having minimal gaps where two distinct LCD panels and constituent glass elements come together.

SUMMARY OF THE INVENTION

According to one aspect of the present invention, a liquid crystal display (LCD) assembly for a gaming machine comprises a set of LCD panels, and a unitary light guide. A first LCD panel includes a pair of opposing first inactive sides and an active first display region between the pair of first inactive sides. The second LCD panel includes a pair of opposing second inactive sides and an active second display region between the pair of second inactive sides. The second LCD panel is positioned alongside the first LCD panel such that one of the pair of second inactive sides overlaps one of the first inactive sides of the first LCD panel, but does not obstruct the first display region. The first and second LCD panels are mounted against a unitary light guide lying behind the LCD panels, configured to illuminate both the first and second LCD panels.

According to another aspect of the present invention, a gaming machine is disclosed comprising an input device, game-logic circuitry, and a liquid crystal display (LCD) assembly. The input device receives an input indicative of a wager to play a wagering game. The game-logic circuitry comprises one or more central processing units and one or more memory devices, the one or more memory devices storing instructions that, when executed by the one or more central processing units, cause the game-logic circuitry to receive the input and initiate the wagering game, and display the wagering game on the LCD assembly. The LCD assembly includes a first LCD panel, a second LCD panel, and a unitary light guide. The first LCD panel includes a pair of opposing first inactive sides and an active first display region between the pair of first inactive sides. The second LCD panel includes a pair of opposing second inactive sides and an active second display region between the pair of second inactive sides. The second LCD panel is positioned alongside the first LCD panel and overlapping one of the first inactive sides, without obstructing the first display region of the first LCD panel. The first and second LCD panels are mounted against a unitary light guide lying behind the LCD panels, configured to illuminate both the first and second LCD panels.

According to another aspect of the invention, a method for making a liquid crystal display (LCD) assembly for a gaming machine is disclosed. The method includes providing a first LCD panel including a pair of opposing first inactive sides and an active first display region between the pair of first inactive sides. The method further includes providing a second LCD panel including a pair of opposing second inactive sides and an active second display region between the pair of second inactive sides. The first and second LCD panels are arranged such that the second LCD panel is positioned alongside the first LCD panel with the second LCD panel overlapping one of the first inactive sides, but not the first display region, of the first LCD panel. A unitary light guide is arranged under both the first and second LCD panels such that the light guide can illuminate both the first and second LCD panels.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 7A is a cross sectional view of a compound LCD display assembly mounted in a gaming machine having a display transition device.

FIG. 7B is a magnified inset of the compound LCD display assembly shown in FIG. 7A.

Figure 1:
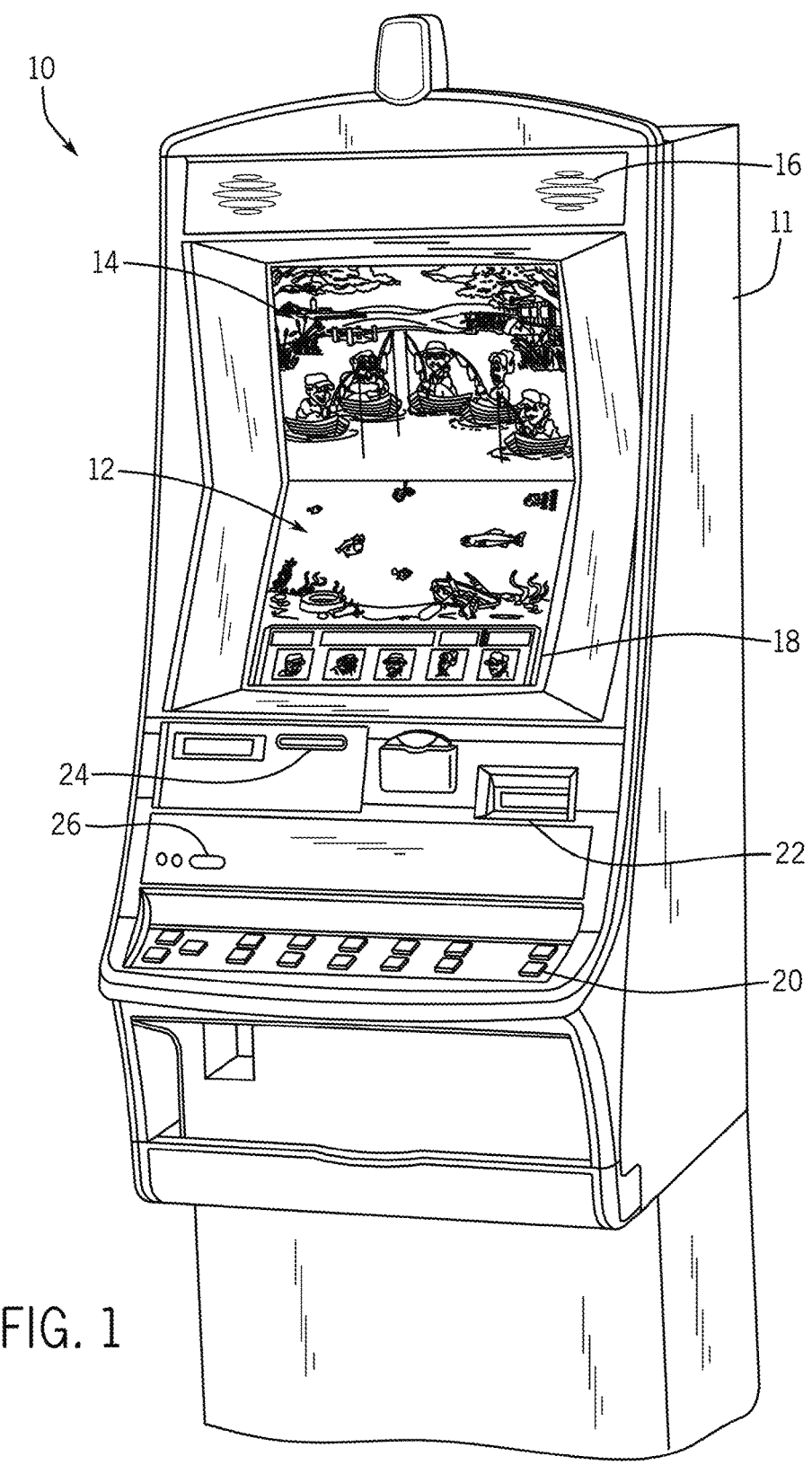
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those used in gaming establishments, such as casinos. With regard to the present invention, the gaming machine 10 may be any type of gaming terminal or machine and may have varying structures and methods of operation. For example, in some aspects, the gaming machine 10 is a floor standing electronic gaming terminal configured to play a video casino game, such as slots, keno, poker, blackjack, roulette, craps, etc.

The gaming machine 10 illustrated in FIG. 1 comprises a cabinet 11 that may house various input devices, output devices, and input/output devices. By way of example, the gaming machine 10 includes a primary LCD 12, a secondary LCD 14, and one or more audio speakers 16. The primary LCD 12 or the secondary LCD 14 may be a transmissive LCD disposed in front of a mechanical-reel display to portray a video image superimposed upon the mechanical-reel display. The LCDs 12, 14 may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touchscreen 18 which overlays the primary LCD 12 and the secondary LCD 14, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

Input devices, such as the touch screen 18, buttons 20, a mouse, a joystick, a gesture-sensing device, a voice-recognition device, and a virtual-input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a game-logic circuitry for processing. The electronic data signals are selected from a group consisting essentially of an electrical current, an electrical voltage, an electrical charge, an optical signal, an optical element, a magnetic signal, and a magnetic element.

Figure 2:
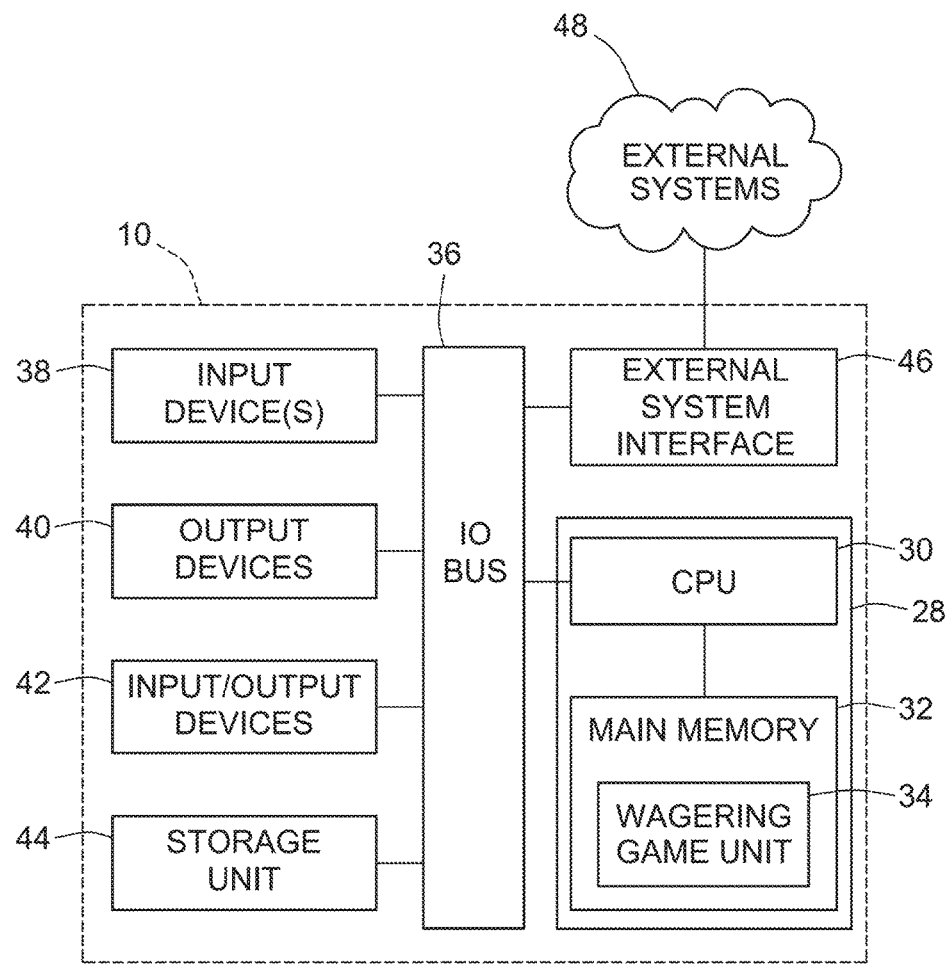
FIG. 2 is a schematic view of a gaming system according to an embodiment of the present invention.

Turning now to FIG. 2, there is shown a block diagram of the gaming-machine architecture. The gaming machine 10 includes game-logic circuitry 28 having a central processing unit (CPU) 30 connected to a main memory 32. The CPU 30 may include any suitable processor(s), such as those made by Intel and AMD. By way of example, the CPU 30 may include a plurality of microprocessors including a master processor, a slave processor, and a secondary or parallel processor. Game-logic circuitry 28, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 28, and more specifically the CPU 30, comprises one or more controllers or processors and such one or more controllers or processors need not be disposed proximal to one another and may be located in different devices or in different locations. The game-logic circuitry 28, and more specifically the main memory 32, comprises one or more memory devices which need not be disposed proximal to one another and may be located in different devices or in different locations. The game-logic circuitry 28 is operable to execute all of the various gaming methods and other processes disclosed herein. The main memory 32 includes a wagering-game unit 34. In one embodiment, the wagering-game unit 34 may cause wagering games to be presented, such as video poker, video blackjack, video slots, video lottery, etc., in whole or part.

The game-logic circuitry 28 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to a storage unit 44 and an external-system interface 46, which may be connected to external system(s) 48 (e.g., wagering-game networks).

The external system 48 includes, in various aspects, a gaming network, other gaming machines or terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external-system interface 46 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 48 such that the gaming machine 10 operates as a thin, thick, or intermediate client. The game-logic circuitry 28—whether located within ("thick client"), external to ("thin client"), or distributed both within and external to ("intermediate client") the gaming machine 10—is utilized to provide a wagering game on the gaming machine 10. In general, the main memory 32 (comprising one or more memory devices) stores programming for an RNG, game-outcome logic, and game assets (e.g., art, sound, etc.). When a wagering-game instance is executed, the CPU 30 (comprising one or more processors or controllers) executes the RNG programming to generate one or more pseudo-random numbers. The pseudo-random numbers are utilized by the CPU 30 when executing the game-outcome logic to determine a resultant outcome for that instance of the wagering game. The resultant outcome is then presented to a player of the gaming machine 10 by accessing the associated game assets, required for the resultant outcome, from the main memory 32. The CPU 30 causes the game assets to be presented to the player as outputs from the gaming machine 10 (e.g., audio and video presentations).

The gaming machine 10 may include additional peripheral devices or more than one of each component shown in FIG. 2. Any component of the gaming-machine architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
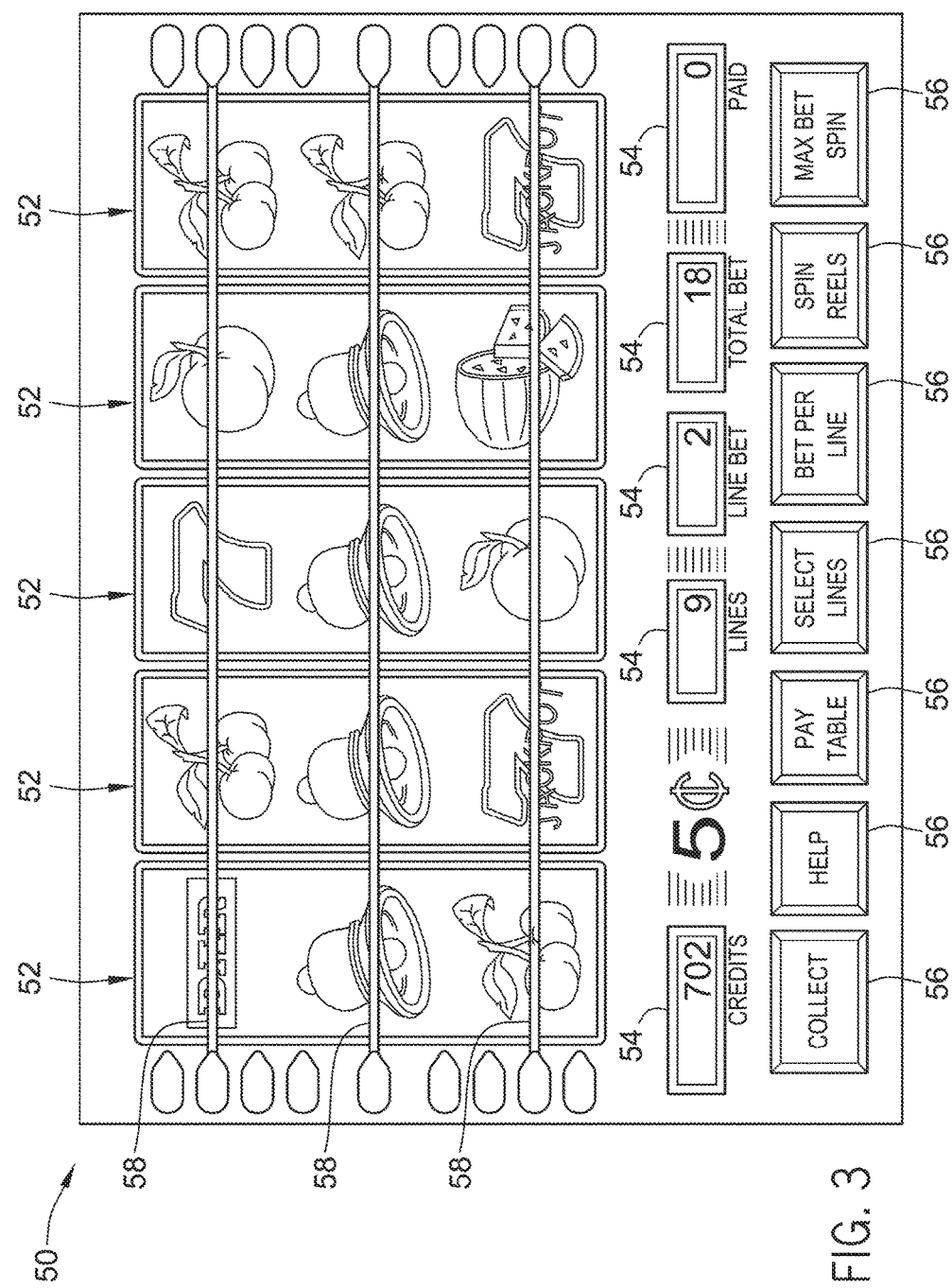
FIG. 3 is an image of an exemplary basic-game screen of a wagering game displayed on a gaming machine, according to an embodiment of the present invention.

Referring now to FIG. 3, there is illustrated an image of a basic-game screen 50 adapted to be displayed on the primary LCD 12 and/or the secondary LCD 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The game-logic circuitry 28 operates to execute a wagering-game program causing the primary LCD 12 and/or the secondary LCD 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., the primary LCD 12 and the secondary LCD 14) through the display of information such as, but not limited to, text, graphics, static images, moving images, etc., or any combination thereof. In accordance with the method of conducting the wagering game, the game-logic circuitry 28 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 28 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 30 causes the recording of a digital representation of the wager in one or more storage media (e.g., storage unit 44), the CPU 30, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU 30 (e.g., the wager in the present example). As another example, the CPU 30 further, in accord with the execution of the stored instructions relating to the wagering game, causes the primary LCD 12, other display device, or other output device (e.g., speakers, lights, communication device, etc.) to change from a first state to at least a second state, wherein the second state of the primary LCD comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 28 to determine the outcome of the wagering-game instance. In at least some aspects, the game-logic circuitry is configured to determine an outcome of the wagering-game instance at least partially in response to the random parameter.

Both the primary LCD 12 and the secondary LCD 14 include a typical glass LCD display panel having an active display region between a pair of opposing inactive sides positioned on the edge of the LCD panel. A typical glass LCD panel used in each of the LCDs 12, 14 may include a LCD glass element comprising a set of layered material films which may be confined together in a suitable frame or housing. In many cases, the frame or housing is positioned to cover the inactive sides at the edges of the LCD panel. The set of layered material films which make up each LCD panel may include a polarizing filter film to polarize entering light, a glass substrate with electrodes to control imagery on the display, a nematic liquid crystal, a second polarizing filter film to block/pass light, and optionally, a reflective surface to return light to the viewer. The reflective surface may be replaced with a light source for a backlit LCD.

Effective backlighting to drive imagery and contrast on the LCD displays may be achieved in various ways. This includes lighting the LCD glass elements using two cold cathode fluorescent lamps (CCFLs) as light sources placed at opposite edges of the display. Alternatively, an array of parallel CCFLs may be implemented behind larger displays. The light guide and diffuser then spreads the light out evenly across the entire display enabling each active display region of the LCD panel to receive light and provide imagery. Unlike white light emitting diodes (LEDs), most modern CCFLs have an even-white spectral output resulting in better color gamut for the display. CCFLs are less energy efficient than LEDs and may require an inverter to convert/elevate DC voltage needed to light a CCFL. It is also possible to implement LED backlighting for a flat panel LCD display instead of, or in addition to, CCFL backlighting. The light sources can be positioned on opposing edges of the light guide and diffuser assembly, or arranged behind the light guide and diffuser assembly in an array of lighting elements.

Figure 4A:
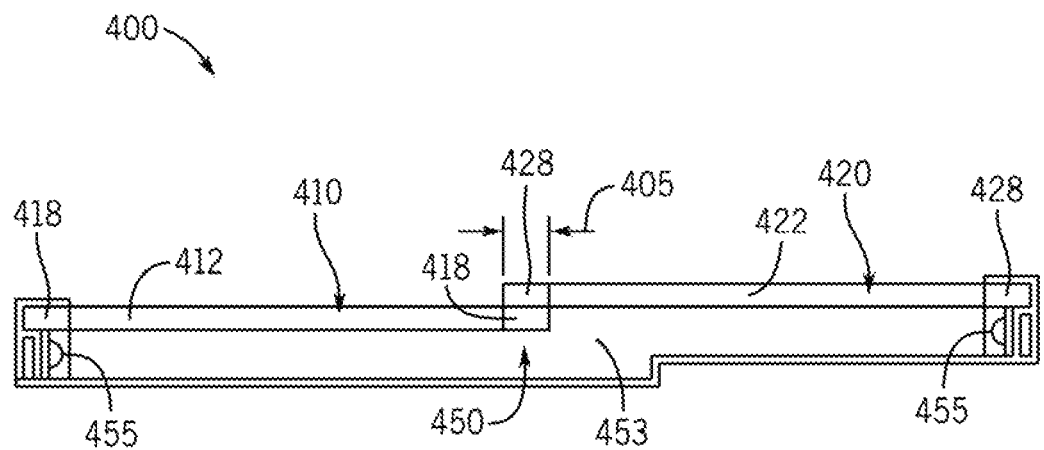
FIG. 4A is a cross sectional view of a compound LCD display assembly having two planar aligned LCD glass elements.

Referring to FIG. 4A, a compound LCD display assembly 400 is shown in one embodiment. The approach to minimize the inactive border area 405 between monitors involves modifying the relative positions of the liquid crystal display (LCD) panel glass elements 410, 420. Each of the glass elements 410, 420 has a respective pair of inactive sides (418, 428) and a respective active display region (412, 422). The backlight assembly 450 has a unitary light guide and diffuser 453 lit by light sources 455 providing light for displaying images on the active display regions 412, 422 of the glass elements 410, 420. The glass elements 410, 420 may be parallel to each other, and the light guide diffuser 453 may be flat to accommodate the parallel glass elements 410, 420.

One set of inactive sides 418, 428 of the glass elements 410, 420 are overlapped such that the active display regions 412, 422 are in closer proximity than would be possible if the complete assemblies were simply abutted together. In this configuration, the upper LCD glass element 420 overlaps the lower LCD glass element 410 in the inactive border area 405 (i.e., the gap between the active display regions 412, 422). The overlapped positioning significantly reduces the spacing between the active display regions 412, 422 of the glass elements 410, 420. Thus, when the active display regions 412, 422 display imagery, the overlapped inactive sides 418, 428 reduce the inactive gap border area 405 positioned there between.

Figure 4B:
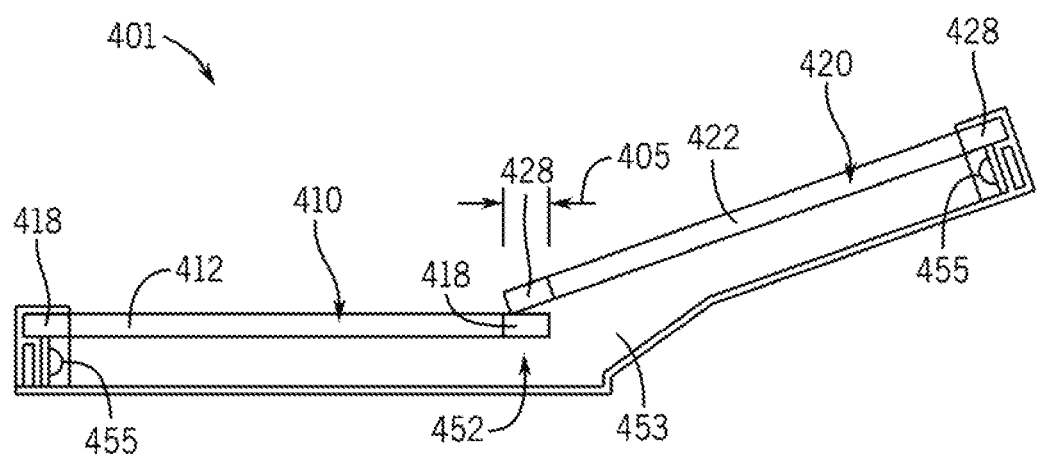
FIG. 4B is a cross sectional view of a compound LCD display assembly having two angularly aligned LCD glass elements.

Additionally, the glass elements 410, 420 do not need to be positioned parallel. As shown in FIG. 4B, an angle between a set of LCD panels is introduced to simulate the immersive experience of a curved, panoramic display which may be mounted vertically or horizontally in one embodiment. In this configuration, two distinct LCD glass elements 410, 420, each having an active display region between a pair of opposing inactive sides 418, 428, are mounted adjacently at an obtuse angle against a shared, non-flat backlight assembly 452. In this embodiment, the backlight assembly 452 comprises a unitary light guide and diffuser 453 and a pair of light sources 455 providing light for the glass elements 410, 420.

To reduce the inactive border area space further, it is possible to cut the glass elements 410, 420 to create LCD display shapes that are inconvenient to fabricate directly. Cutting an LCD panel to any fraction of a given prefabricated height is fairly straightforward. For example, when an LCD glass element 420 is cut horizontally (and the element 420 sealed), the majority of the inactive area 428 on that side of the LCD display is removed without significant impact to the remaining active display region 422. After the glass element 420 is cut and sealed, there remains a relatively small inactive side 428 that no longer functions as an LCD (typically on the order of 0.050-0.100 inches). It is also possible that the inactive side 428 can be made (relatively) transparent. The reduction of the inactive side 428 enables closer mounting and assembly of the glass elements 410, 420, minimizing the inactive dead zone 405 visible between the active display regions 412, 422.

Figure 5A:
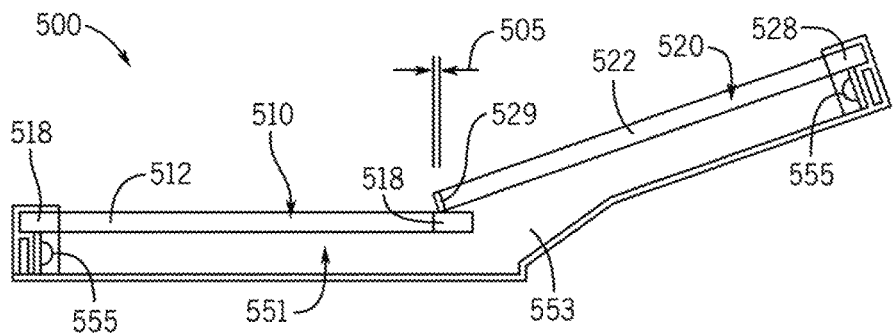
FIG. 5A is a cross sectional view of a compound LCD display assembly having two angularly aligned LCD glass elements, where a reduced inactive side of one LCD glass element overlaps an inactive side of the other LCD glass element.

FIG. 5A shows another embodiment including a compound LCD panel display assembly 500 having a modified LCD panel glass element 520. The glass element 520 is cut to remove a portion of one inactive side 528 at one edge of the LCD display, leaving a smaller inactive side 529. In this embodiment, glass element 510 is essentially unmodified, resembling the LCD glass element 410 of FIG. 4. The backlight assembly 551 consists of a unitary light guide and diffuser 553 which distributes light from light sources 555 and provides the glass elements 510, 520 with light for displaying images on the active display regions 512, 522. The inactive side 528 positioned at one end of the glass element 520 is removed by cutting and sealing to create an inactive side 529. Thus, the upper LCD panel glass element 520 has a comparatively smaller inactive region adjacent to the active display region 522 (inactive side 529) positioned at the edge of the glass element 520. The glass element 520 is mounted against the backlight assembly 551 overlapping one inactive side 518 of the lower glass element 510, concealing the corresponding inactive side 518 from view. The glass elements 510, 520 are arranged such that light delivery from the backlight assembly 551 is fully maintained to both panels, enabling the active display region 522 (viewing portion) of the upper glass element 520 to mask the inactive side 518 of the lower glass element 510. This minimizes the inactive "dead" region 505 at the border of the two LCD displays when viewing the compound LCD display assembly 500. Further, the inactive region 505 between displayed images on the active display regions 512, 522 of the two glass elements 510, 520 is effectively reduced to the width of the inactive side 529 on the cut panel and made very small, as discussed prior. This creates a nearly seamless and continuous LCD viewing surface capable of displaying images which may utilize both glass elements 510, 520 having a very small interposed inactive region 505 there between.

Figure 5B:
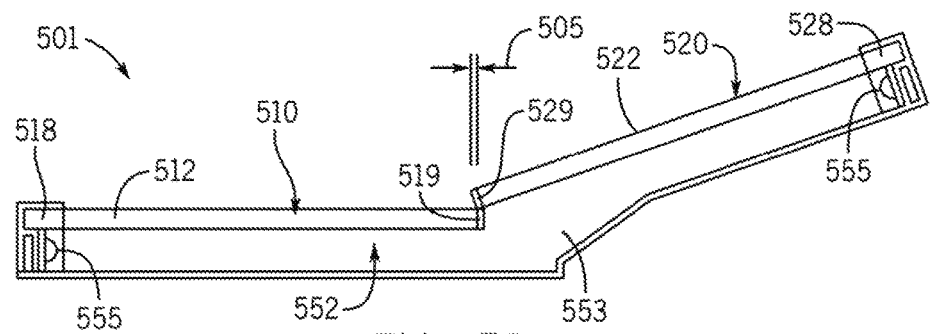
FIG. 5B is a cross sectional view of a compound LCD display assembly having two angularly aligned LCD glass elements, where a reduced inactive side of one LCD glass element overlaps a reduced inactive side of the other LCD glass element.

FIG. 5B shows another embodiment including a compound LCD display assembly 501 having two cut (and sealed) LCD glass elements 510, 520. In this embodiment, both glass elements 510, 520 are separated from the unified backlight assembly 552, cut and sealed at one edge, and remounted to enable the backlight diffuser 553 for displaying images on the active display regions 512, 522 of the glass elements 510, 520 using the light generated by light sources 555. The inactive side 518 of glass element 510 is unaltered (i.e., uncut) on one side at the edge of the compound LCD display assembly 501. The inactive side 518 on the opposite side of the glass element 510 is removed by cutting and sealing the glass element 510, creating a smaller inactive side 519 adjacent to the active display region 512. Likewise, an inactive side 528 on one end of the glass element 520 is also removed by cutting and sealing glass element 520, creating a smaller inactive side 529 adjacent to the active display region 522.

The glass elements 510, 520 are mounted against the backlight assembly 552 such that the two small inactive sides 519, 529 are aligned to minimize the inactive area 505 from a viewing position of the compound LCD display assembly 501 and maximize the viewable space defined by the active display regions 512, 522. Further, light delivery from the backlight assembly 552 to the combined viewable regions of both glass elements 510, 520 is easier to ensure because there is a smaller section of the upper glass element 522 shielding the inactive side 519 of the glass element 510. This substantially reduces the combined inactive region 505 for images displayed on the active display regions 512, 522 of the glass elements 510, 520 The inactive region 505 is effectively the width of the inactive side 529 on the glass element 520, maintaining full utilization of the active portions of both glass elements 510, 520.

Figure 6:
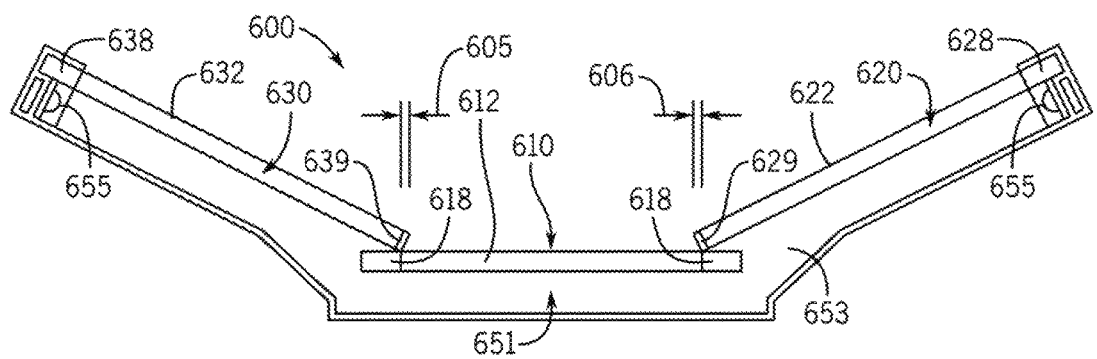
FIG. 6 is a cross sectional view of a compound LCD display assembly having two angularly aligned LCD glass elements, each having a reduced inactive side overlapping a common LCD glass element.

FIG. 6 shows another embodiment including a compound LCD display assembly 600. The compound LCD display assembly 600 includes an uncut LCD glass element 610 flanked by two cut and sealed LCD glass elements 620, 630. The glass element 610 includes an active viewing region 612 and inactive sides 618. The two glass elements 620, 630, each have an unaltered inactive side 628, 638, respectively, positioned near the edge of the compound LCD display assembly 600. Opposite the inactive sides 628, 638, the glass elements 620, 630 have been cut to create two reduced inactive sides 629, 639.

In this embodiment, the unified backlight assembly 651 includes a unitary backlight light guide and diffuser 653 to provide the glass elements 610, 620, 630 with light generated by light sources 655 for displaying images on each of the active display regions 612, 622, 632. The center glass element 610 is uncut, having an inactive side 618 opposed at each edge, and is mounted to the backlight assembly 651. Alternatively, the glass element 610 may be cut to remove as much of the inactive region 618 as possible without impacting the viewable section of the LCDs as a whole. The removal of the excess inactive side(s) 618 may enable better distribution and diffusion of light (from the backlight assembly 651), to the viewable areas of the glass elements 620, 630 adjacent to the glass element 610. The glass elements 620, 630 are generally mounted against the backlight assembly 651 such that the two reduced inactive sides 629, 639 are aligned with the inactive sides 618 of the glass element 610 to minimize the inactive "dead" viewable regions 605, 606 from a viewing position of the compound LCD display assembly 600.

A display transition device of the type described below in connection with FIG. 7 may additionally be used to shield the gap where any two LCD panel assemblies overlap. This creates a transition area which may be illuminated with an RGB LED system, or comparable display device. The color and/or imagery for the transition area may be chosen to complement the images on the two adjacent LCD panels.

FIG. 7A is a cross sectional side-view of a gaming system 700 having a compound LCD display assembly 500 mounted and installed as a component inside a cabinet 703 of a gaming terminal 701 in one embodiment. FIG. 7B is a detail view of a region of FIG. 7A. The LCD display assembly 500 further includes two LCD glass elements 510, 520 having an intermediately mounted display transition device 708. The glass element 510 is comprised of an active viewing region 512 and an uncut inactive side 518 positioned at the edge where the two assemblies are directly adjacent. The glass element 520 has an active viewing region 522 and an inactive side 529 at the edge where the two glass elements 510, 520 are directly adjacent. The glass elements 510, 520 are mounted against the light guide diffuser 553 providing light to display images on the active display regions 512, 522 of each of the two assemblies. The glass element 520 is mounted against the unitary light guide and diffuser 553, such that the inactive side 529 of glass element 520 overlaps the inactive side 518 of the lower LCD glass element 510.

A display transition device 708 is mounted to shield from view the combination of the overlap of the inactive side 518 and the inactive side 529 of the LCD display assembly 500. In one embodiment, the transition device 708 comprises an edge lit LED element, precisely positioned to provide suitable blending of imagery and color at the juncture of the two LCD glass elements 510, 520. In another embodiment, the display transition device 708 may comprise another video display screen 709 (see FIG. 7B) configured to dynamically display aspects of a wagering game (e.g., modulated and dynamic lighting, moving and static text, graphics, images, etc.) where the two glass elements 510, 520 come together.

In one embodiment the transition display device 708 substantially matches the width of the active viewable region 512, 522 of the glass elements 510, 520 (e.g., 27" wide), and roughly shields the inactive region 505 where the glass elements 510, 520 are adjacent (approx. ¼" tall). As differing screen sizes and LCD panel glass elements are implemented, differing transition display devices having differing dimensions are within the spirit and scope of the invention. Achieving the appearance of a single, elongated and continuous display may require the display transition device 708 be sized and shaped, for example, to complement and otherwise accommodate the packaging parameters of the gaming terminal 701.

Further, to achieve the appearance of a single, elongated and curved display, it may be necessary for the glass elements 510, 520 and the display transition device 708 to approximately share the same display resolution and/or overall appearance when illuminated. For example, this may include roughly the same pixel density or number of pixels per unit area, or controlling video output such that the viewer does not readily perceive the movement of objects (or other aspects of the wagering game) when motion occurs back-and-forth between the glass elements 510, 520 across the display transition device 708. Thus, it may be preferable for the gaming terminal 701 (or gaming system 700) to include a single display controller (not shown) that is operatively connected to and configured to control all three devices, namely, the glass elements 510, 520 and the display device 709. This feature can allow for more synchronous operation of the display devices. It may also be desirable, in some embodiments, that the video display screen 709 of the display transition device 708 be flexible. By way of example, the glass elements 510, 520 can be movably mounted to the cabinet 703 such that the glass elements 510, 520 may be adjusted with respect to each other. In this instance, the display transition device 708 can be sufficiently flexible to bend with the moving LCD panel assemblies 510, 520 without requiring the display transition device 709 be first removed or otherwise replaced.

The display transition device 708 may implement various types of technology to achieve a desired merging with the display generated by the glass elements 510, 520. The display transition device 708 may include a flexible OLED (organic light-emitting diode) display. One such OLED display panel is the active-matrix organic light-emitting diode (AMOLED) screen, commercially available from LG Display Co., Ltd., of Seoul, South Korea. The "active-matrix" portion refers to the technology used for addressing pixels and OLED includes a specific type of thin-film-display technology in which organic compounds form the electroluminescent material.

In another optional configuration, the display screen 709 may include an organic thin-film transistor (OTFT) display panel, which may be integrated with OLED technology. One such OTFT display is the Rollable OTFT-Driven OLED Panel, which is commercially available from Sony Corp., of Tokyo, Japan. In yet another optional configuration, the display screen 709 includes an LED tube display comprising a plurality of juxtaposed LED tubes. One such LED tube display is the LED Tube Screen, which is commercially available from Zhuhai iTech Electronic Technology Co., Ltd., of Guangdong Province, China.

Each of these embodiments and obvious variations thereof is contemplated as falling within the spirit and scope of the claimed invention, which is set forth in the following claims. Moreover, the present concepts expressly include any and all combinations and subcombinations of the preceeding elements and aspects.

What is claimed is:

1. A liquid crystal display (LCD) assembly for a gaming machine, the assembly comprising:
   a first LCD panel including a pair of opposing first inactive sides and an active first display region between the pair of first inactive sides;
   a second LCD panel including a pair of opposing second inactive sides and an active second display region between the pair of second inactive sides, the second LCD panel being positioned alongside the first LCD panel and overlapping one of the first inactive sides, but not the first display region, of the first LCD panel; and
   a unitary light guide underlying both the first and second LCD panels and configured to illuminate both the first and second LCD panels.

2. The assembly of claim 1, wherein the first and second LCD panels are generally parallel to each other, and the light guide is generally flat.

3. The assembly of claim 1, wherein the first and second LCD panels form an obtuse angle relative to each other, and the light guide is generally non-flat.

4. The assembly of claim 1, wherein the first and second display regions are configured to display imagery, and the pair of first inactive sides and the pair of second inactive sides are incapable of displaying imagery.

5. The assembly of claim 1, wherein one of the second inactive sides of the second LCD panel overlaps the one of the first inactive sides of the first LCD panel, and wherein the one of the second inactive sides has been cut and sealed to substantially remove any inactive region thereof.

6. The assembly of claim 5, wherein the one of the first inactive sides of the first LCD panel has been cut and sealed to substantially remove any inactive region thereof.

7. A gaming machine, comprising:
   an input device;
   a liquid crystal display (LCD) assembly including:

a first LCD panel including a pair of opposing first inactive sides and an active first display region between the pair of first inactive sides;

a second LCD panel including a pair of opposing second inactive sides and an active second display region between the pair of second inactive sides, the second LCD panel being positioned alongside the first LCD panel and overlapping one of the first inactive sides, but not the first display region, of the first LCD panel; and a unitary light guide underlying both the first and second LCD panels and configured to illuminate both the first and second LCD panels; and game-logic circuitry, comprising one or more central processing units and one or more memory devices, the one or more memory devices storing instructions that, when executed by the one or more central processing units, cause the game-logic circuitry to:

receive, via the input device, an input indicative of a wager to play a wagering game; and display the wagering game on the LCD assembly.

8. The gaming machine of claim 7, wherein the first and second LCD panels are generally parallel to each other, and the light guide is generally flat.

9. The gaming machine of claim 7, wherein the first and second LCD panels form an obtuse angle relative to each other, and the light guide is generally non-flat.

10. The gaming machine of claim 7, wherein the first and second display regions are configured to display imagery, and the pair of first inactive sides and the pair of second inactive sides are incapable of displaying imagery.

11. The gaming machine of claim 7, wherein one of the second sides of the second LCD panel overlaps the one of the first inactive sides of the first LCD panel, and wherein the one of the second inactive sides has been cut and sealed to substantially remove any inactive region thereof.

12. The gaming machine of claim 11, wherein the one of the first inactive sides of the first LCD panel has been cut and sealed to substantially remove any inactive region thereof.

13. A method of making a liquid crystal display (LCD) assembly for a gaming machine, the method comprising:

providing a first LCD panel including a pair of opposing first inactive sides and an active first display region between the pair of first inactive sides;

providing a second LCD panel including a pair of opposing second inactive sides and an active second display region between the pair of second inactive sides;

arranging the second LCD panel alongside the first LCD panel with the second LCD panel overlapping one of the first inactive sides, but not the first display region, of the first LCD panel; and arranging a unitary light guide under both the first and second LCD panels such that the light guide can illuminate both the first and second LCD panels.

14. The method of claim 13, wherein the first and second LCD panels are positioned generally parallel to each other, and the light guide is generally flat.

15. The method of claim 13, wherein the first and second LCD panels are positioned to form an obtuse angle relative to each other, and the light guide is generally non-flat.

16. The method of claim 13, wherein the first and second display regions are configured to display imagery, and the pair of first inactive sides and the pair of inactive second sides are incapable of displaying imagery.

17. The method of claim 13, wherein one of the second inactive sides of the second LCD panel overlaps the one of the first inactive sides of the first LCD panel, and wherein the one of the second inactive sides has been cut and sealed to substantially remove any inactive region thereof.

18. The method of claim 13, wherein the one of the first inactive sides of the first LCD panel has been cut and sealed to substantially remove any inactive region thereof.

* * * * *